（12） United States Patent
Sunohara et al.

(10) Patent No.: US 6,833,899 B2
(45) Date of Patent: Dec. 21, 2004

(54) LIQUID CRYSTAL DISPLAY

(75) Inventors: Kazuyuki Sunohara, Kanazawa (JP); Yasushi Kawata, Ageo (JP); Yuuzo Hisatake, Yokohama (JP); Kisako Ninomiya, Fukaya (JP); Natsuko Fujiyama, Fukaya (JP); Akio Murayama, Fukaya (JP); Takeshi Yamaguchi, Kumagaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/418,132

(22) Filed: Apr. 18, 2003

(65) Prior Publication Data
US 2003/0197819 A1 Oct. 23, 2003

(30) Foreign Application Priority Data

Apr. 19, 2002 (JP) ........................................ 2002-118137
Apr. 26, 2002 (JP) ........................................ 2002-126328

(51) Int. Cl.[7] ..................... G02F 1/1337; G02F 1/1343
(52) U.S. Cl. ..................... 349/142; 349/129; 349/144
(58) Field of Search ................................. 349/129, 142, 349/144

(56) References Cited

U.S. PATENT DOCUMENTS

| | | | | |
|---|---|---|---|---|
| 5,796,456 A | * | 8/1998 | Takatori et al. | 349/117 |
| 5,872,611 A | * | 2/1999 | Hirata et al. | 349/147 |
| 6,195,144 B1 | * | 2/2001 | Murai et al. | 349/117 |

* cited by examiner

Primary Examiner—Huyen Ngo
(74) Attorney, Agent, or Firm—Oblon, Spivak, McClelland, Maier & Neustadt, P.C.

(57) ABSTRACT

Provided is a liquid crystal display including an array substrate with first to third comb-shaped electrodes on a main surface thereof, a counter substrate with a common electrode that faces the first to third comb-shaped electrodes on a main surface thereof, a liquid crystal layer sandwiched between the array and counter substrates, and a color filter supported by one of the array and counter substrates and including first to third coloring layer facing the first to third comb-shaped electrodes, respectively, wherein the first comb-shaped electrode is different in shape and/or orientation from the second and third comb-shaped electrodes.

9 Claims, 7 Drawing Sheets

# LIQUID CRYSTAL DISPLAY

CROSS-REFERENCE TO RELATED APPLICATIONS

This application is based upon and claims the benefit of priority from the prior Japanese Patent Applications No. 2002-118137, filed Apr. 19, 2002; and No. 2002-126328, filed Apr. 26, 2002, the entire contents of both of which are incorporated herein by reference.

BACKGROUND OF THE INVENTION

1. Field of the Invention

The present invention relates to a liquid crystal display.

2. Description of the Related Art

A liquid crystal display, which is thin, light in weight and low in power consumption, is used is various fields such as OA equipment, an information terminal, a watch and a television receiver. Particularly, a liquid crystal display equipped with a thin film transistor (TFT) exhibits a high response capability and, thus, is used as a monitor of an apparatus that displays a large amount of information, such as a portable television receiver or a portable computer.

In recent years, demands for a picture image of high definition and short response time are being increased, in parallel with the increase amount of information. Of the above, high definition images are accomplished by, for example, miniaturization of the array structure forming the TFT.

On the other hand, concerning the demand for the shortening of the response time, it is being studied to employ the display mode using a nematic liquid crystal, such as an IPS mode, an HAN mode, an OCB mode, a π-mode and a multi domain-type VAN (Vertical Aligned Nematic) mode, or the display mode using a smectic liquid crystal, such as a surface stabilized ferroelectric liquid crystal mode and an antiferroelectric liquid crystal mode, in place of the conventional display mode.

Among these display modes, the multi domain-type VAN mode permits obtaining a response speed higher than that in the conventional TN (Twisted Nematic) mode. Also, a rubbing treatment that generates undesired phenomena such as an electrostatic destroy is not required in the multi domain-type VAN mode because the liquid crystal molecules are oriented in the vertical direction in the multi domain-type VAN mode. Further, the design for the compensation of the viewing angle can be achieved relatively easily in the multi domain-type VAN mode.

However, the viewing angle for the multi domain-type VAN mode is smaller than that for the IPS mode. Naturally, it is desirable to further broaden the viewing angle in the multi domain-type VAN mode.

BRIEF SUMMARY OF THE INVENTION

According to a first aspect of the present invention, there is provided a liquid crystal display, comprising an array substrate with first to third pixel electrodes on a main surface thereof, a counter substrate with a common electrode that faces the first to third pixel electrodes on a main surface thereof, a liquid crystal layer sandwiched between the array and counter substrates, and a color filter supported by one of the array and counter substrates and comprising first to third coloring layer facing the first to third pixel electrodes, respectively, wherein the display is configured to form first and second optical regions different from each other in electric field intensity in each of first to third pixel regions between the common electrode and the first to third pixel electrodes when voltage is applied therebetween, the first and second optical regions extending in a direction that is parallel to the liquid crystal layer and alternately arranged in a direction that crosses a longitudinal direction of the first optical region in each of the first to third pixel regions, and the first pixel region being different in the longitudinal direction of the first optical region from the second and third pixel regions.

According to a second aspect of the present invention, there is provided a liquid crystal display, comprising an array substrate with first to third pixel electrodes on a main surface thereof, a counter substrate with a common electrode that faces the first to third pixel electrodes on a main surface thereof, a liquid crystal layer sandwiched between the array and counter substrates, and a color filter supported by one of the array and counter substrates and comprising first to third coloring layer facing the first to third pixel electrodes, respectively, wherein the display is configured to form first and second optical regions different from each other in electric field intensity in each of first to third pixel regions between the common electrode and the first to third pixel electrodes when voltage is applied therebetween, the first and second optical regions extending in a direction that is parallel to the liquid crystal layer and alternately arranged in a direction that crosses a longitudinal direction of the first optical region in each of the first to third pixel regions, and wherein the first pixel region is different in a shape of the first and/or second optical region from the second and third pixel regions.

According to a third aspect of the present invention, there is provided a liquid crystal display, comprising an array substrate with first to third comb-shaped electrodes on a main surface thereof, a counter substrate with a common electrode that faces the first to third comb-shaped electrodes on a main surface thereof, a liquid crystal layer sandwiched between the array and counter substrates, and a color filter supported by one of the array and counter substrates and comprising first to third coloring layer facing the first to third comb-shaped electrodes, respectively, wherein the first comb-shaped electrode is different in shape and/or orientation from the second and third comb-shaped electrodes.

Where voltage is applied between the pixel electrode and the common electrode under the state that polarizers are arranged on the sides of the light source and the observer, the first optical region and the second optical region can be observed as regions differing from each other in the transmittance or the reflectance. In other words, the first and second optical regions can be confirmed by actually measuring the intensity of the electric field and/or by examining the transmittance or the reflectance.

It is not absolutely necessary for a clear boundary to be present between the first optical region and the second optical region. In other words, it is possible for the intensity of the electric field and the magnitudes of the transmittance or the reflectance to be changed continuously in the arranging direction of the first optical region and the second optical region.

Where a clear boundary is not formed between the first optical region and the second optical region, the sum of the width of the first optical region and the width of the second optical region is scarcely dependent on a boundary value, which is a value defining the boundary between the first and the second optical regions. However, the individual widths of the first and second optical regions are dependent on the boundary value. It follows that, where it is necessary to obtain the boundary between the first optical region and the second optical region, an appropriate value such as an average value of the electric field intensity, the transmittance or the reflectance can be used as the boundary value.

DETAILED DESCRIPTION OF THE INVENTION

Figure 1:
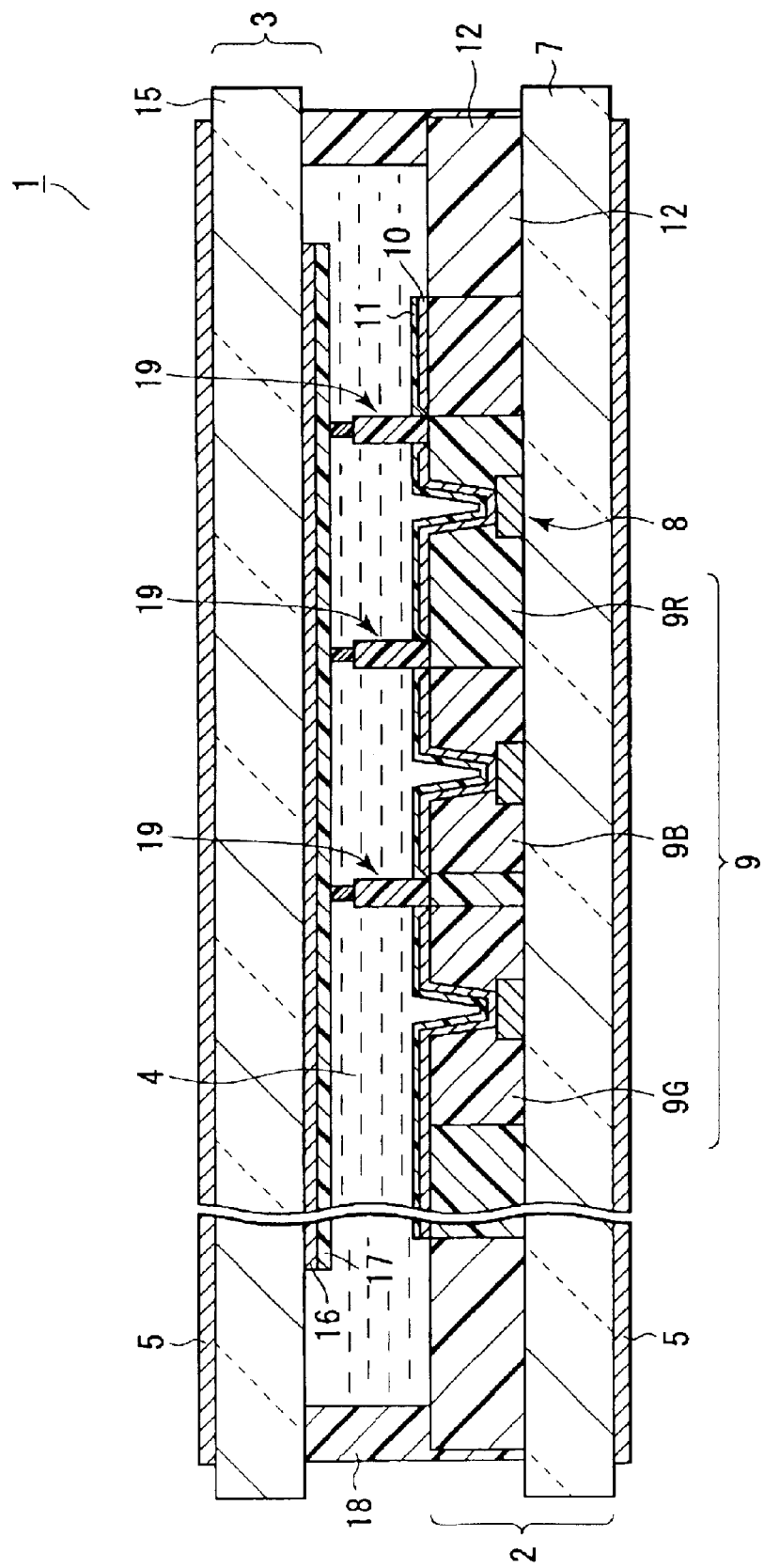
FIG. 1 is a cross sectional view schematically showing the construction of a liquid crystal display according to a first embodiment of the present invention.

Embodiments of the present invention will now be described with reference to the accompanying drawings. In the accompanying drawings, the constituting elements performing the same or similar functions are denoted by the same reference numerals so as to omit the overlapping description.

FIG. 1 is a cross sectional view schematically showing the construction of a liquid crystal display 1 according to a first embodiment of the present invention. The liquid crystal display 1 shown in FIG. 1 is a liquid crystal display of a multi domain-type VAN mode and includes an active matrix substrate (or an array substrate) 2 and a counter substrate 3. The active matrix substrate 2 is bonded to the counter substrate 3 with an adhesive layer 18 interposed therebetween such that a closed space is formed between the substrates 2 and 3. The clearance between the active matrix substrate 2 and the counter substrate 3 is maintained constant by spacers 19, and the closed space formed between the substrates 2 and 3 is filled with a liquid crystal material constituting a liquid crystal layer 4. Also, a polarizing film (or polarizer) 5 is laminated on each surface of the liquid crystal display 1.

The active matrix substrate 2 includes a transparent substrate 7 such as a glass substrate. Wirings and switching elements 8 are formed on one main surface of the transparent substrate 7. A color filter 9 and a peripheral light shielding layer 12 are also formed on the surface of the transparent substrate 7. Further, pixel electrodes 10 and an alignment layer 11 are formed on the color filter 9.

The wirings formed on the transparent substrate 7 include, for example, scanning lines and signal lines made of, for example, aluminum, molybdenum or copper. On the other hand, the switching elements 8 are, for example, thin film transistors (TFTs) each including a semiconductor layer made of, for example, an amorphous silicon or a polycrystalline silicon (polysilicon) and a metal layer made of, for example, aluminum, molybdenum, chromium, copper or tantalum, and are connected to the wirings such as scanning lines and signal lines and to the pixel electrodes 10. The particular construction of the active matrix substrate 2 permits selectively applying voltage to the desired pixel electrode 10.

The color filter 9 interposed between the transparent substrate 7 and the pixel electrode 10 includes blue, green and red coloring layers 9B, 9G and 9R. Contact holes are formed in the color filter 9 so as to permit the pixel electrodes 10 to be connected to the switching elements via the contact holes.

The pixel electrodes 10 are made of a transparent conductive material such as ITO (Indium Tin Oxide). It is possible to form the pixel electrodes 10 by forming first a thin film of a transparent conductive material by, for example, a sputtering method, followed by patterning the thin film by employing photolithography and etching.

The alignment layer 11 is a thin film made of a transparent resin such as polyimide. Incidentally, in the first embodiment of the present invention, a rubbing treatment does not performed on the alignment layer 11 since the alignment layer 11 is a vertical alignment layer.

The counter substrate 3 includes a transparent substrate 15 such as a glass substrate. A common electrode 16 and an alignment layer 17 are formed successively on the transparent substrate. It is possible for the common electrode 16 and the alignment layer 16 to be made of the materials equal to those used for forming the pixel electrodes 19 and the alignment layer 11, respectively. Also, a rubbing treatment does not performed on the alignment layer 17 since the alignment layer 17 is a vertical alignment layer. Incidentally, in the first embodiment of the present invention, the common electrode 16 is formed in the form of a flat continuous film.

Figure 2:
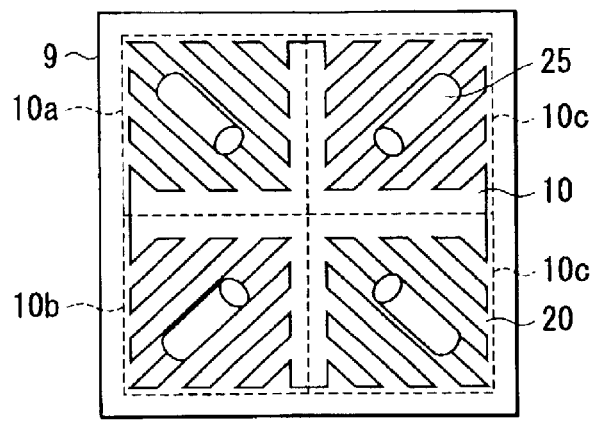
FIG. 2 is a plan view schematically exemplifying a construction that can be utilized in the liquid crystal display shown in FIG. 1.

FIG. 2 is a plan view schematically exemplifying the construction that can be employed in the liquid crystal display shown in FIG. 1. In the construction shown in FIG. 2, the pixel electrode 10 includes four sections 10a to 10d. Slits 20 are formed in parallel at a prescribed period in each of the sections 10a to 10d. It should be noted that the sections 10a to 10d differ from each other in the longitudinal direction of the slit 20. In other words, the pixel electrode 10 is a comb-shaped electrode includes the four comb-shaped sections 10a to 10d differing from each other in the longitudinal direction of the slit 20. In the liquid crystal display 1 shown in FIG. 1, the particular construction described above permits the pixel region to be divided into four domains differing from each other in the tilting direction of the liquid crystal molecules in conformity with the sections 10a to 10d. This will now be described with reference to FIGS. 3A to 3D.

Figure 3A:
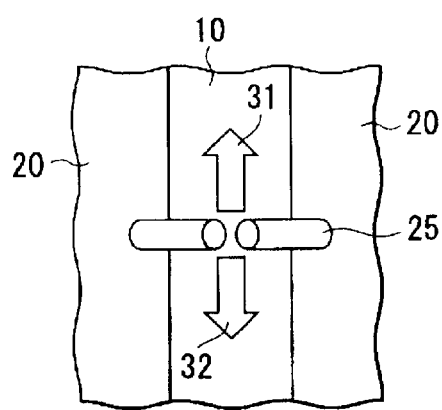
FIGS. 3A to 3D schematically show the change in the orientation of the liquid crystal molecules that can be generated in the case of employing the structure shown in FIG. 2 in the liquid crystal display shown in FIG. 1.
Figure 3C:
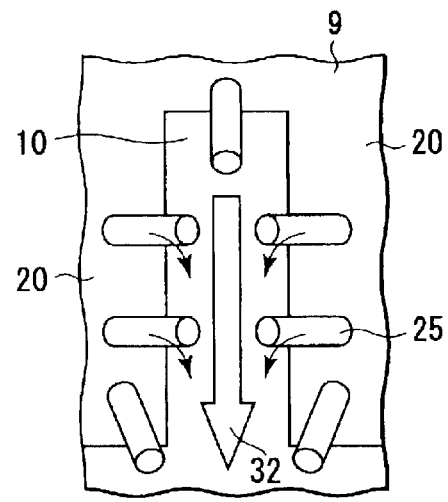
Figure 3B:
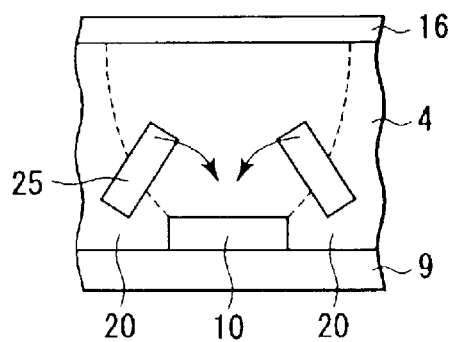
Figure 3D:
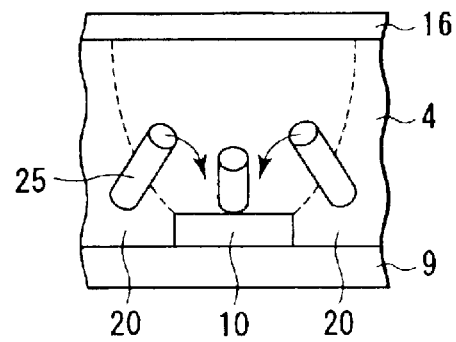

FIGS. 3A to 3D schematically show the change in the orientation of the liquid crystal molecules that is brought about in the case of employing the construction shown in FIG. 2 in the liquid crystal display shown in FIG. 1. Incidentally, FIGS. 3A and 3C are plan views, and FIGS. 3B and 3D are side views showing the constructions shown in FIGS. 3A and 3C observed from the lower sides in the drawings, respectively. Also, some of the constituting elements are omitted in FIGS. 3A to 3D for the sake of simplicity.

Where a voltage is not applied between the pixel electrode 10 and the common electrode 16, the alignment layers 11 and 17 serve to permit liquid crystal molecules 25, which form the liquid crystal layer 4 and have a negative dielectric anisotropy in the present embodiment, to be oriented in the vertical direction. As a result, the liquid crystal molecules 25 are oriented such that the major axes of the liquid crystal molecules are rendered substantially perpendicular to the film surface of the alignment layer 11.

If a relatively low first voltage is applied between the pixel electrode 10 and the common electrode 16, a leakage electric field is generated above the slit 20 of the pixel electrode 10. As a result, the electric flux lines are inclined as shown in FIG. 3B.

The electric field generated by application of voltage between the pixel electrode 10 and the common electrode 16 serves to permit the liquid crystal molecules 25 to be oriented in a direction perpendicular to the electric flux line. It follows that the liquid crystal molecules 25 are oriented as shown in FIG. 3A by the effects of the alignment layers 11, 17 and the electric field.

However, under the sate shown in FIG. 3A, an interference is brought about between the orienting state of the liquid crystal molecules on the right side and the orienting state of the liquid crystal molecules 25 on the left side. As a result, the tilting direction of the liquid crystal molecules 25 is changed upward or downward in the drawing so as to assume a more stable alignment state.

Suppose the portion sandwiched between a pair of slits 20 of the pixel electrode 10 or the region in the vicinity of the particular portion is shaped symmetrical or isotropic in the up-down direction in the drawing, as shown in FIG. 3A. In this case, the probability for the tilting direction of the liquid crystal molecules 25 to be changed upward as denoted by an arrow 31 is rendered equal to the probability for the tilting direction of the liquid crystal molecules 25 to be changed downward as denoted by an arrow 32.

On the other hand, where the portion sandwiched between the pair of the slits 20 of the pixel electrode 10 and the region in the vicinity of the particular portion is asymmetric or anisotropic in the up-down direction in the drawing, as shown in FIG. 3C, the electric flux lines are rendered asymmetric between the both edge portions of the pixel electrode 10. The electric flux lines are also rendered asymmetric between the both edge portions of the slit 20. As a result, the alignment state in which the liquid crystal molecules 25 are oriented in the direction denoted by the arrow 32 is rendered more stable than the alignment state in which the liquid crystal molecules 25 are oriented in the direction denoted by the arrow 31. It follows that the average tilting direction (director) of the liquid crystal molecules 25 extends downward as denoted by an arrow 32 in FIG. 3C.

If the voltage applied between the pixel electrode 10 and the common electrode 16 is increased to a second voltage higher than the first voltage, the effect of the electric field on the orientation of the liquid crystal molecules 25, i.e., the force to make the liquid crystal molecules 25 oriented in the direction perpendicular to the electric flux line, becomes much greater than the effect of the alignment layers 11 and 17 on the orientation of the liquid crystal molecules 25, i.e., the force to make the liquid crystal molecules 25 oriented in the vertical direction. It follows that the liquid crystal molecules 25 are caused to change the tilting angle toward the horizontal orientation.

It should be noted that, even where the second voltage is applied between the pixel electrode 10 and the common electrode 16, the alignment state in which the liquid crystal molecules 25 are oriented in the direction denoted by the arrow 32 is more stable than the alignment state in which the liquid crystal molecules 25 are oriented in the direction denoted by the arrow 31 as in the case where the first voltage is applied between the pixel electrode 10 and the common electrode 16. It follows that, in the case where the voltage applied between the pixel electrode 10 and the common electrode 16 is changed within a range of between the first voltage and the second voltage, the director of the liquid crystal molecules 25 is changed within a plane perpendicular to the arranging direction of the slits 20. In other words, where the voltage applied between the pixel electrode 10 and the common electrode 16 is changed within a range of between the first voltage and the second voltage, the liquid crystal molecules 25 are caused to change the tilting angle while maintaining the average tilting direction within a plane perpendicular to the arranging direction of the slits 20.

Therefore, by allowing the four sections 10a to 10d to differ from each other in the longitudinal direction of the slit 20, it is possible to change the tilting angle while maintaining the tilting direction of the liquid crystal molecules 25 as shown in FIG. 2. In other words, it is possible to form in a single pixel region four domains, differing from each other in the tilting direction of the liquid crystal molecules 25, only by a structure of the active matrix substrate 2. Also, in the first embodiment of the present invention, it is possible to change the tilting angle while maintaining the average tilting direction of the liquid crystal molecules 25 within a plane perpendicular to the arranging direction of the slits 20, with the result that it is possible to achieve a high response speed. In addition, an alignment defect is unlikely to take place, and formation of domains in a pixel region takes place satisfactorily.

In the first embodiment of the present invention, one of the pixel electrode 10 facing the blue coloring layer 9B, the pixel electrode 10 facing the green coloring layer 9G and the pixel electrode 10 facing the red coloring layer 9R differs from the other two pixel electrodes 10 in the longitudinal direction of the slit 20. In the case of employing the particular construction, it is possible to achieve a wide viewing angle, as described in the following.

Figure 4:
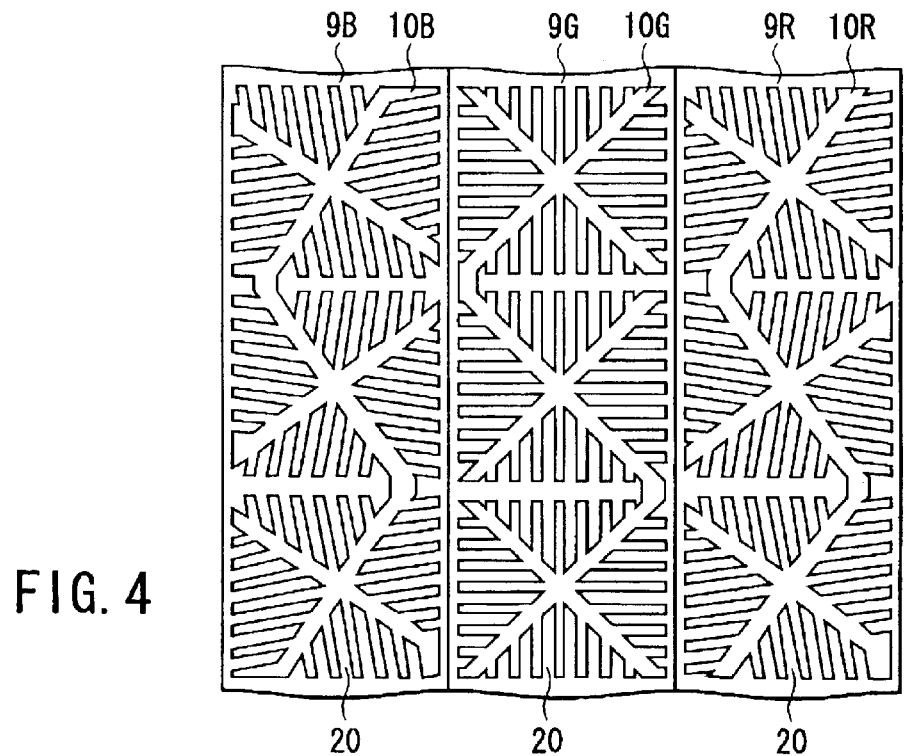
FIG. 4 is a plan view schematically exemplifying the construction of a pixel electrode that can be utilized in the liquid crystal display shown in FIG. 1.

FIG. 4 is a plan view schematically exemplifying the construction of the pixel electrode that can be employed in the liquid crystal display shown in FIG. 1. Incidentally, FIG. 4 depicts the coloring layers 9B, 9G and 9R and the pixel electrode 10 alone among the construction that is observed when the liquid crystal display 1 is viewed perpendicularly to the main surface of the liquid crystal display 1. Also, the pixel electrodes 10 corresponding to the coloring layers 9B, 9G and 9R are denoted by reference numerals 10B, 10G and 10R, respectively.

When, for example, the second voltage is applied between the pixel electrode 10 and the common electrode 16, the liquid crystal layer 4 performs the function similar to that performed by a λ/2 retardation plate. Therefore, in order to achieve a wide viewing angle, it is desirable for the observing angle dependence of the phase difference between a pair of linearly polarized lights, which is imparted by the liquid crystal layer 4, to be rendered substantially constant in respect of the light of all the wavelengths, so as to suppress the change in the displayed color in accordance with the observing angle.

The phase difference between a pair of linearly polarized lights, which is imparted by the liquid crystal layer 4, is proportional to the refractive index anisotropy Δn of the liquid crystal material and to the optical path length d, and is inversely proportional to the wavelength λ. Generally, it is difficult to change the optical path length d in accordance with the wavelength λ. Therefore, in order to render the observing angle dependence of the phase difference between a pair of linearly polarized lights, which is imparted by the liquid crystal layer 4, substantially constant in respect of the light of all the wavelengths, it is necessary to use a liquid crystal material having a constant ratio of the refractive index anisotropy Δn to the wavelength λ. However, it is impractical to use such a liquid crystal material.

On the other hand, in the construction shown in FIG. 4, the pixel electrode 10B, the pixel electrode 10G and the pixel electrode 10R are made different from each other in the longitudinal direction of the slits 20. Where at least two of the pixel electrodes 10B, 10G and 10R corresponding to the coloring layers 9B, 9G and 9R, respectively, are rendered different from each other in the longitudinal direction of the slit 20, at least two of the pixel regions corresponding to the pixel electrodes 10B, 10G and 10R are rendered different from each other in the tilting directions of the liquid crystal molecules. As a result, at least two of the pixel regions corresponding to the pixel electrodes 10B, 10G and 10R are rendered different from each other in the slow phase axis of the liquid crystal layer 4.

The phase difference generated by the passage of a pair of linearly polarized lights through the liquid crystal layer 4 and the observing angle dependence of the phase difference are changed in accordance with the angle made between the polarization plane of the linearly polarized light incident on the liquid crystal layer 4 and the slow phase axis of the liquid crystal layer 4. Also, the pixel regions corresponding to the pixel electrodes 10B, 10G and 10R play the role of modulating the light rays differing from each other in the wavelength. Therefore, by setting appropriately the angle made between the longitudinal directions of the slits 20 and by setting appropriately the angle made between the transmission easy axis of the polarizing film 5 and the longitudinal direction of the slit 20 for at least two of the pixel electrodes 10B, 10G and 10R, it becomes possible to suppress the change in the displayed color in accordance with the observing angle. In other words, it is possible to achieve a wide viewing angle.

In the first embodiment of the present invention, the effect described above can be obtained, if at least two of the pixel electrodes 10B, 10G and 10R are different from each other in the longitudinal direction of the slit 20. In general, the effect is rendered prominent in the case where the difference between the longitudinal direction of the slit 20 is at least 5°.

In the first embodiment of the present invention, it suffices for one of the pixel electrodes 10B, 10G, 10R to be different from the other pixel electrodes in the longitudinal direction of the slit 20. However, it is possible for the pixel electrodes 10B, 10G, 10R to be different from each other in the longitudinal directions of the slits 20.

In the first embodiment of the present invention, it is desirable to set at about 45° the angle made between the longitudinal direction of the slit 20 formed in one of the pixel electrodes 10B, 10G, 10R and the transmission easy axis of one of the polarizing films 5. The angle referred to above is advantageous for achieving a high transmittance.

For example, where the angle made between the transmission easy axis of one of the polarizing film 5 and the longitudinal direction of the slit 20 formed in the pixel electrode 10R is set at about 45°, it is possible to set the angle made between the transmission easy axis noted above and the longitudinal direction of the slit 20 formed in the pixel electrode 10B at an angle deviated from 45°, and to set the angle made between the transmission easy axis noted above and the longitudinal direction of the slit 20 formed in the pixel electrode 10G at an angle less deviated from 45°.

Also, where the angle made between the transmission easy axis of one of the polarizing film 5 and the longitudinal direction of the slit 20 formed in the pixel electrode 10G is set at about 45°, it is possible to set the deviation of the angle made between the transmission easy axis noted above and the longitudinal direction of the slit 20 formed in the pixel electrode 10B from 45° substantially equal to the deviation of the angle made between the transmission easy axis noted above and the longitudinal direction of the slit 20 formed in the pixel electrode 10R from 45°.

Further, where the angle made between the transmission easy axis of one of the polarizing film 5 and the longitudinal direction of the slit 20 formed in the pixel electrode 10B is set at about 45°, it is possible to set the angle made between the transmission easy axis noted above and the longitudinal direction of the slit 20 formed in the pixel electrode 10R at an angle deviated from 45°, and to set the angle made between the transmission easy axis noted above and the longitudinal direction of the slit 20 formed in the pixel electrode 10G at an angle less deviated from 45°.

Among the cases exemplified above, it is desirable to set the angle made between the transmission easy axis of one of the polarizing films 5 and the longitudinal direction of the slit 20 formed in the pixel electrode 10G at about 45°. In this case, it is possible to obtain the greatest effect of suppressing the change in the displayed color in accordance with the observing angle.

As described above, in the first embodiment of the present invention, first and second optical regions differing from each other in the intensity of the electric field are formed in the pixel region within the liquid crystal layer 4 when a prescribed voltage is applied between the pixel electrode 10 and the common electrode 16 such that these optical regions extend in one direction and are alternately arranged repeatedly in the direction crossing the extending direction. Also, in the first embodiment of the present invention, one of the pixel region facing the blue coloring layer 9B, the pixel region facing the green coloring layer 9G and the pixel region facing the red coloring layer 9R is made different from the other two pixel regions in the longitudinal direction of the first or second optical region. As a result, it is possible to suppress the change of the displayed color in accordance with the viewing angle so as to make it possible to achieve a wide viewing angle.

In other words, according to the first embodiment of the present invention, it is possible to provide a liquid crystal display capable of realizing a wide viewing angle in the case of utilizing a multi domain-type VAN mode.

A second embodiment of the present invention will now be described. The liquid crystal display according to the second embodiment of the present invention is equal to the liquid crystal display 1 according to the first embodiment of the present invention, except that the second embodiment differs from the first embodiment in the construction of the pixel electrode 10.

As already described in conjunction with the first embodiment, the liquid crystal layer 4 plays the role similar to that played by a λ/2 retardation plate when, for example, a second voltage is applied between the pixel electrode 10 and the common electrode 16. Therefore, in order to achieve a wide viewing angle, it is desirable for the observing angle dependence of the phase difference between a pair of linearly polarized lights, which is imparted by the liquid crystal layer 4, to be rendered substantially constant in respect of the light of all the wavelengths, so as to suppress the change in the displayed color in accordance with the observing angle.

In the second embodiment of the present invention, the pixel regions corresponding to the pixel electrodes 10B, 10G and 10R are rendered different from each other in the shape of the first and/or second optical regions. In a typical case, the comb-shaped pixel electrodes 10B, 10G and 10R are rendered different from each other in the ratio of the width and/or area of the comb-teeth portion to the slit 20. In this case, it is possible to allow the pixel regions corresponding to the pixel electrodes 10B, 10G and 10R to be different from each other in the density of the electric flux lines, i.e., the intensity of the electric field. It follows that it is possible to allow these pixel regions to be different from each other in the tilting angle of the liquid crystal molecules 25.

The situation that the pixel regions corresponding to the pixel electrodes 10B, 10G and 10R differ from each other in the tilting angle of the liquid crystal molecule 25 implies that the pixel regions noted above also differ from each other in the effective refractive index anisotropy Δn of the liquid crystal material. Also, the phase difference between a pair of linearly polarized lights, which is imparted by the liquid crystal layer 4, is proportional to the refractive index anisotropy Δn of the liquid crystal material. It follows that the observing angle dependence of the phase difference between a pair of linearly polarized lights, which is imparted by the liquid crystal layer 4, can be rendered substantially constant in respect of the light of all the wavelengths, by appropriately setting the shape of the first and/or second optical regions. In other words, it is possible to suppress the change in the displayed color in accordance with the observing angle so as to achieve a wide viewing angle.

Figure 5:
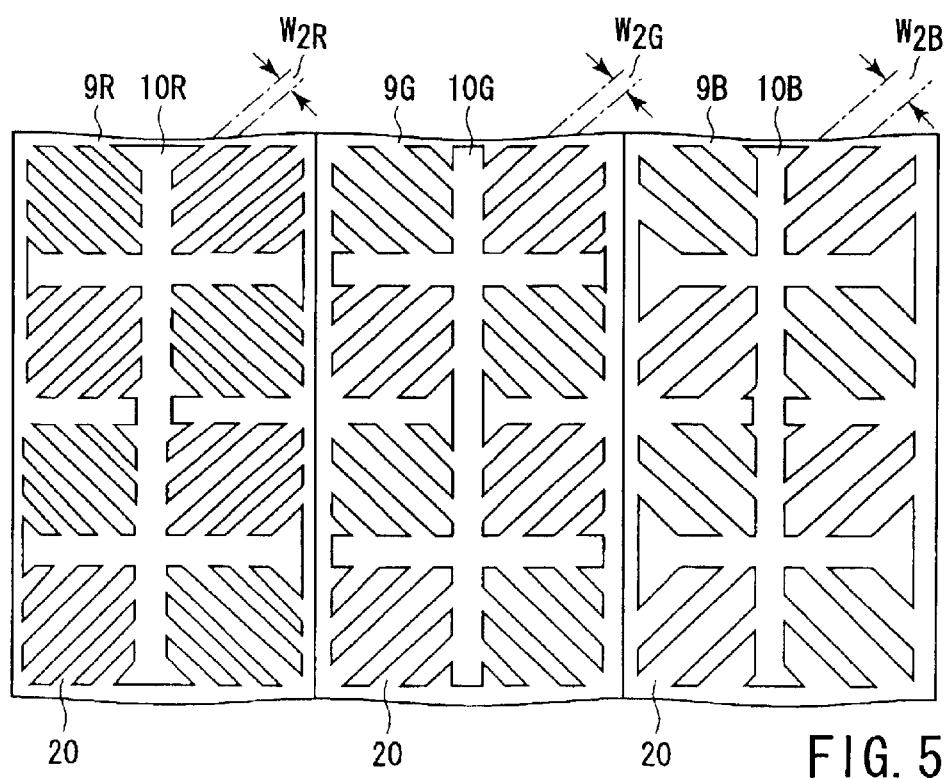
FIG. 5 is a plan view schematically exemplifying the construction of a pixel electrode that can be utilized in the liquid crystal display according to a second embodiment of the present invention.

FIG. 5 is a plan view schematically exemplifying the construction of the pixel electrode that can be utilized in the liquid crystal display 1 according to the second embodiment of the present invention. Incidentally, FIG. 5 depicts the coloring layers 9B, 9G and 9R and the pixel electrode 10 observed when the liquid crystal display 1 is viewed perpendicularly to the main surface of the liquid crystal display 1. Also, the pixel electrodes 10 corresponding to the coloring layers 9B, 9G and 9R are denoted by reference numerals 10B, 10G and 10R, respectively.

The construction shown in FIG. 5 is substantially equal to the construction shown in FIG. 4 except the aspect pointed out below. Specifically, in the construction shown in FIG. 4, the comb-shaped pixel electrode 10G differs in orientation from each of the comb-shaped pixel electrodes 10B and 10R. On the other hand, in the construction shown in FIG. 5, the comb-shaped pixel electrodes 10B, 10G and 10R are equal in orientation to each other. Also, in the construction shown in FIG. 4, the pixel electrodes 10B, 10G and 10R are equal in the width of the slit 20 to each other. In the construction shown in FIG. 5, however, the width $W_{2G}$ of the slit 20 formed in the pixel electrode 10G, the width $W_{2B}$ of the slit 20 formed in the pixel electrode 10B, and the width $W_{2R}$ of the slit 20 formed in the pixel electrode 10R differ from each other.

Where at least two of the pixel electrodes 10B, 10G and 10R corresponding to the coloring layers 9B, 9G and 9R differ from each other in the width of the slit 20 as described above, the pixel regions corresponding to the pixel electrodes 10B, 10G and 10R are rendered different from each other in the tilting angle of the liquid crystal molecules, i.e., in the effective refractive index anisotropy Δn of the liquid crystal material. As a result, it is possible to suppress the change in the displayed color in accordance with the observing angle.

In the second embodiment of the present invention, the particular effect described above can be obtained, if at least two of the pixel electrodes 10B, 10G and 10R are rendered different from each other in the width $W_2$ of the slit 20. It is also possible to obtain the particular effect described above in the case where at least two of the pixel electrodes 10B, 10G and 10R are rendered different from each other in the width of the comb-teeth portion. Further, the particular effect can be obtained in the case where at least two of the pixel electrodes 10B, 10G and 10R are rendered different from each other in both the width of the comb-teeth portion and the width of the slit 20.

In the second embodiment of the present invention, it suffices for one of the pixel electrodes 10B, 10G and 10R to differ from the other pixel electrodes in the shape for obtaining the particular effect. Of course, it is possible for all three pixel electrodes 10B, 10G and 10R to differ from each other in shape.

As described above, in the second embodiment of the present invention, first and second optical regions differing from each other in the intensity of the electric field are formed in the pixel region within the liquid crystal layer 4 when a prescribed voltage is applied between the pixel electrode 10 and the common electrode 16 such that these optical regions extend in one direction and are alternately arranged repeatedly in the direction crossing the extending direction. Also, in the second embodiment of the present invention, one of the pixel region facing the blue coloring layer 9B, the pixel region facing the green coloring layer 9G and the pixel region facing the red coloring layer 9R is made different from the other two pixel regions in the shape of the first and/or second optical region. As a result, it is possible to suppress the change of the displayed color in accordance with the viewing angle so as to make it possible achieve a wide viewing angle.

In other words, according to the second embodiment of the present invention, it is possible to provide a liquid crystal display capable of realizing a wide viewing angle in the case of utilizing a multi domain-type VAN mode.

The techniques described above in conjunction with the first and second embodiments of the present invention can be utilized in combination. For example, in the construction shown in FIG. 4, it is possible for the pixel electrodes 10B, 10G and 10R to be made different from each other in the width of the slit 20.

In each of the first and second embodiments of the present invention, the image display is performed by controlling the optical characteristics of the liquid crystal layer 4, and the optical characteristics of the liquid crystal layer 4 are controlled by forming a plane wave-like distribution in the intensity of a electric field within the pixel region and by changing the intensity of the electric field. The formation of such a distribution in the intensity of the electric field can be actually confirmed by, for example, applying voltage to the pixel electrode 10 under the state that the counter substrate 3 is removed from the active matrix substrate 2. It is also possible to confirm the formation of the distribution in the intensity of the electric field by the method described below.

In performing the control described above, an electric field having an intensity higher than that in the portion on the slit 20 is formed in a portion on the pixel electrode 10 in the liquid crystal layer 4. As a result, the liquid crystal molecules 25 in the portion on the pixel electrode 10 are inclined more greatly than the liquid crystal molecules 25 in the portion on the slit 20. In other words, the portion on the pixel electrode 10 and the portion on the slit 20 in the liquid crystal layer 4 are rendered different from each other in the average tilting angle of the liquid crystal molecules 25. Such a difference in the tilting angle can be observed as an optical difference.

Figure 6:
FIG. 6 exemplifies the distribution of the transmittance that is observed in the case of employing the construction shown in FIG. 2 in the liquid crystal display shown in FIG. 1.

FIG. 6 exemplifies the distribution of the transmittance that is observed in the case of employing the construction shown in FIG. 2 in the liquid crystal display shown in FIG. 1. Incidentally, FIG. 6 shows the plane wave-like distribution of the transmittance that is observed in the case where a third voltage, intermediate between the first and second voltages, is applied between the pixel electrode 10 and the common electrode 16 under the state that a polarizer (or a polarizing film) is arranged on the side of each of the light source and the observer relative to the liquid crystal layer 4. It follows that, according to the first and second embodiments of the present invention, the characteristics described above with reference to FIGS. 1 to 5 can be observed as the optical characteristics.

In the construction described above with reference to FIGS. 2 to 6, the width of the slit 20 is set constant in the longitudinal direction of the slit 20. However, it is possible for the width of the slit 20 to be changed in the longitudinal direction of the slit 20.

Figure 7:
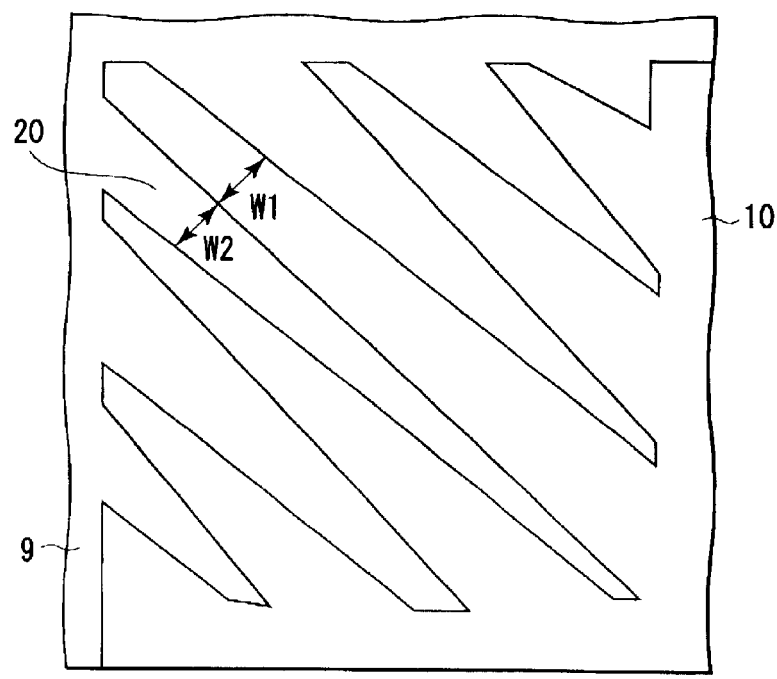
FIG. 7 is a plan view schematically exemplifying the construction that can be employed in the liquid crystal display shown in FIG. 1.
Figure 8:
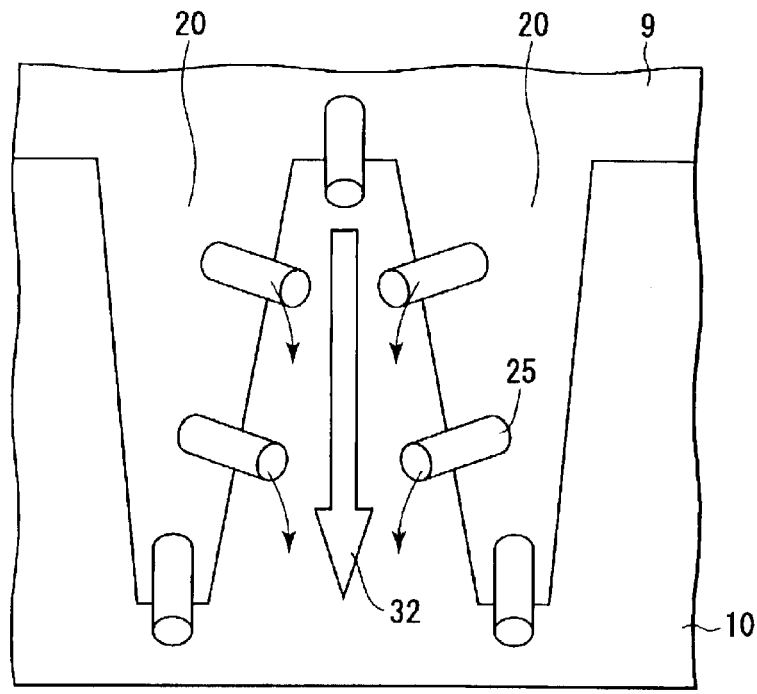
FIG. 8 schematically shows the change in orientation of the liquid crystal molecules that can be generated in the case of employing the construction shown in FIG. 7 in the liquid crystal display shown in FIG. 1.

FIG. 7 is a plan view schematically exemplifying the construction that can be employed in the liquid crystal display shown in FIG. 1. On the other hand, FIG. 8 schematically shows the change in the orientation of the liquid crystal molecules that is brought about in the case of employing the construction shown in FIG. 7 in the liquid crystal display shown in FIG. 1. Incidentally, the section 10a alone of the four sections 10a to 10d is depicted in FIG. 7, and only a part of the section 10a shown in FIG. 6 is depicted in FIG. 8.

In the construction shown in FIGS. 7 and 8, the width of the slit 20 is continuously increased from the central portion of the pixel electrode 10 toward the peripheral portion. According to the particular construction, alignment of liquid crystal induces the director to be oriented in the direction denoted by arrows 32 in not only an upper end of the comb-teeth portion but also side ends of the comb-teeth portion as shown in FIG. 8. It follows that the construction shown in FIGS. 7 and 8 permits further improving the transmittance and the response speed.

In the description given above, distribution of the electric field intensity, in which regions having a low intensity and regions having a high intensity are alternately arranged periodically, is generated in each domain by forming the slit 20 in the pixel electrode 10. If the slit 20 is used for forming the distribution of the electric field intensity, a relatively high degree of freedom in design is possible. However, the electric field distribution can also be generated by another method. Examples will now be described with reference to FIGS. 9A and 9B.

Figure 9A:
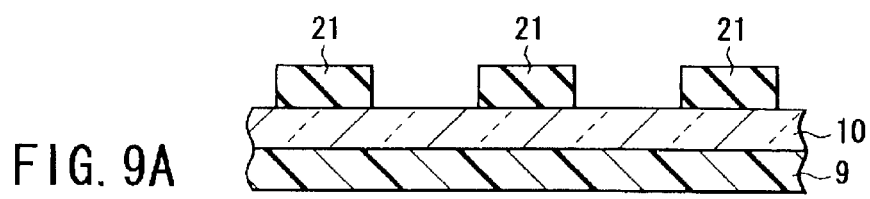
FIGS. 9A and 9B are cross sectional views each exemplifying the construction that can be employed in the liquid crystal display shown in FIG. 1.
Figure 9B:
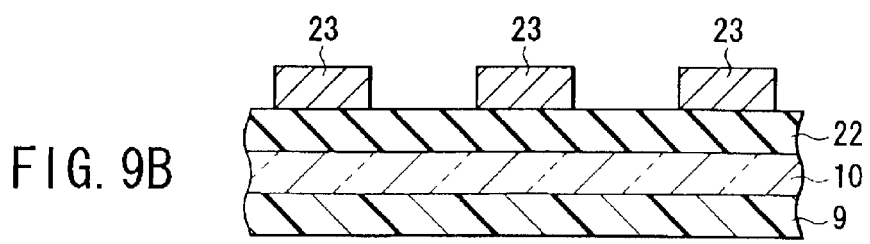

FIGS. 9A and 9B are cross sectional views each schematically exemplifying the construction that can be utilized in the liquid crystal display shown in FIG. 1.

In the construction shown in FIG. 9A, a dielectric layer 21 that is patterned like the slits 20 is formed on the pixel electrode 10 in place of forming the slits 20 on the pixel electrode 10. In this case, a region having an electric field of a lower intensity can be formed above the dielectric layer 21 if a material having a dielectric constant lower than that of the liquid crystal material such as an acrylic resin, an epoxy resin or a novolak resin is used for forming the dielectric layer 21. It follows that it is possible to obtain an effect similar to that obtained in the case of forming the slit 20.

On the other hand, in the construction shown in FIG. 9B, a wiring 23 is formed on the pixel electrode 10 with a transparent insulating layer 22 interposed therebetween in place of forming the slit 20 on the pixel electrode 10. The wiring 23, which forms, for example, a signal line, a gate line or an auxiliary capacitance line, is arranged in a pattern similar to that of the slit 20. According to the construction, a region having an electric field of a higher intensity can be formed above the wiring 23. It follows that it is also possible in this case to obtain an effect similar to that obtained in the case of forming the slit 20.

Incidentally, in the case where the liquid crystal display 1 is of a transmission type, it is desirable in terms of the transmittance to use a transparent material for forming the dielectric layer 21 and the wiring 23. Also, where the liquid crystal display 1 is of a reflection type, it is possible to use an opaque material, such as a metallic material, in addition to the transparent material for forming the dielectric layer 21 and the wiring 23.

In each of the first and second embodiments of the present invention described above, it is desirable for the sum $W_{12}$ of the width $W_1$ of the region having an electric field of a higher intensity and the width $W_2$ of the region having an electric field of a lower intensity within the liquid crystal layer 4 to be not larger than 20 μm. If the sum $W_{12}$ of the widths $W_1$ and $W_2$ noted above is not larger than 20 μm, it is possible to control the orientation of the liquid crystal molecules described above, so as to make it possible to achieve a sufficiently high transmittance. Also, it is desirable for the sum $W_{12}$ noted above to be not smaller than 6 μm. If the sum $W_{12}$ is not smaller than 6 μm, it is possible in general to form the structure that permits forming regions having an electric field of a higher intensity and regions having an electric field of a lower intensity within the liquid crystal layer 4 at a sufficiently high precision. In addition, it is possible to achieve alignment of the liquid crystal with a higher stability.

Incidentally, the sum $W_{12}$ noted above is substantially equal to the sum of the width of the comb-teeth portion of the pixel electrode 10 that is sandwiched between the adjacent slits 20 and the width of the slit 20, the sum of the width of the portion sandwiched between the adjacent dielectric layers 21 and the width of the dielectric layer 21, the sum of the width of the wiring 23 formed on the pixel electrode 10 and the width of the region sandwiched between the adjacent wirings 23, the sum of the width of the region having a larger tilting angle and the width of the region having a smaller tilting angle during application of the third voltage, or the sum of the width of the region having a higher transmittance and the width of the region having a lower transmittance during application of the third voltage. It follows that it is also desirable for each of the sums of the widths noted above to be not larger than 20 $\mu$m and to be not smaller than 6 $\mu$m.

In each of the first and second embodiments of the present invention, it is desirable for each of the width $W_1$ and the width $W_2$ to be not larger than 8 $\mu$m. It is also desirable for each of the width $W_1$ and the width $W_2$ to be not smaller than 4 $\mu$m. Where each of the width $W_1$ and the width $W_2$ falls within a range of between 4 $\mu$m and 8 $\mu$m, a sufficiently high performance in practice can be expected in respect of the response speed and the transmittance.

Incidentally, the width $W_1$ and the width $W_2$ noted above correspond to the width of the comb-teeth portion of the pixel electrode 10 that is sandwiched between the adjacent slits 20 and the width of the slit 20, the width of the region sandwiched between the adjacent dielectric layers 21 and the width of the dielectric layer 21, the width of the wiring 23 formed on the pixel electrode 10 and the width of the region sandwiched between the adjacent wirings 23, the width of the region having a larger tilting angle and the width of the region having a smaller tilting angle during application of the third voltage, and the width of the region having a higher transmittance and the width of the region having a lower transmittance during application of the third voltage, respectively. It follows that it is also desirable for each of the widths noted above to be not larger than 8 $\mu$m and to be not smaller than 4 $\mu$m.

In each of the first and second embodiments of the present invention, the length of the region having an electric field of a higher intensity and the length of the region having an electric field of a lower intensity within the liquid crystal layer 4 should be larger than the width $W_1$ and the width $W_2$, respectively. Also, it is desirable for each of the lengths noted above to be at least twice the width $W_{12}$, which is the sum of the widths $W_1$ and $W_2$. In this case, it is possible to permit more liquid crystal molecules to be oriented in the longitudinal direction of each of these regions.

In each of the first and second embodiments of the present invention described above, both the region having an electric field of a higher intensity and the region having an electric field of a lower intensity in the liquid crystal layer 4 are formed asymmetric in the up-down direction, as shown in FIG. 3C. Alternatively, it is possible for these regions to be formed symmetric in the up-down direction as shown in FIG. 3A. The former case is advantageous over the latter case in terms of, for example, the response speed.

In each of the first and second embodiments of the present invention described above, employed is a VAN mode in which nematic liquid crystal molecules having a negative dielectric anisotropy are vertically aligned. Alternatively, it is also possible to use nematic liquid crystal molecules having a positive dielectric anisotropy. Particularly, where a high contrast is desired, it is possible to achieve a high contrast not lower than, for example, 400:1 and a brighter screen design based on a high transmittance design, by employing a VAN mode and a normally black mode.

In each of the first and second embodiments of the present invention described above, the shapes of the sections 10a to 10d collectively constituting the pixel electrode 10 are not particularly limited. For example, it is possible for each of the sections 10a to 10d to be rectangular or to be fan-shaped.

In each of the first and second embodiments of the present invention described above, the pixel electrode 10 is formed of a plurality of sections 10a to 10d. Alternatively, where it is not desired to divide a single pixel region into a plurality of domains differing from each other in the tilting direction of the liquid crystal molecules, it is possible for the pixel electrode to be formed of a single region alone. Incidentally, where a single pixel region includes a plurality of combinations of the region having an electric field of a higher intensity and the region having an electric field of a lower intensity, it is desirable for the regions having an electric field of a higher intensity or the region having an electric field of a lower intensity, which are included in the adjacent combinations, to be parallel and/or perpendicular to each other, and to differ from each other in the director of the liquid crystal molecules contained in the liquid crystal layer 4 during the voltage application.

In each of the first and second embodiments of the present invention described above, the structure, which permits forming a region having an electric field of a higher intensity and a region having an electric field of a lower intensity within the liquid crystal layer during application of the third voltage, is formed only in the active matrix substrate 2. However, it is possible to form a structure in each of the active matrix substrate 2 and the counter substrate 3 in order to form a region having an electric field of a higher intensity and a region having an electric field of a lower intensity within the liquid crystal layer during application of the third voltage. It should be noted in this connection that, in the former case, high precision positioning utilizing, for example, an alignment mark is rendered unnecessary in forming a cell by bonding the active matrix substrate 2 to the counter substrate 3.

Further, in each of the first and second embodiments of the present invention described above, employed is the structure in which color filter 9 is disposed on the active matrix substrate 2. However, it is also possible to dispose the color filter 9 on the counter substrate 3. It should be noted in this connection that, in the former case, high precision positioning utilizing, for example, an alignment mark is rendered unnecessary in forming a cell by bonding the active matrix substrate 2 to the counter substrate 3.

Some examples of the present invention will now be described.

EXAMPLE 1

A liquid crystal display 1 as shown in FIG. 1 was manufactured as follows. In this Example, the pixel electrodes 10B, 10G and 10R having planar shapes, as shown in FIG. 4, were formed as the pixel electrode 10.

Figure 10:
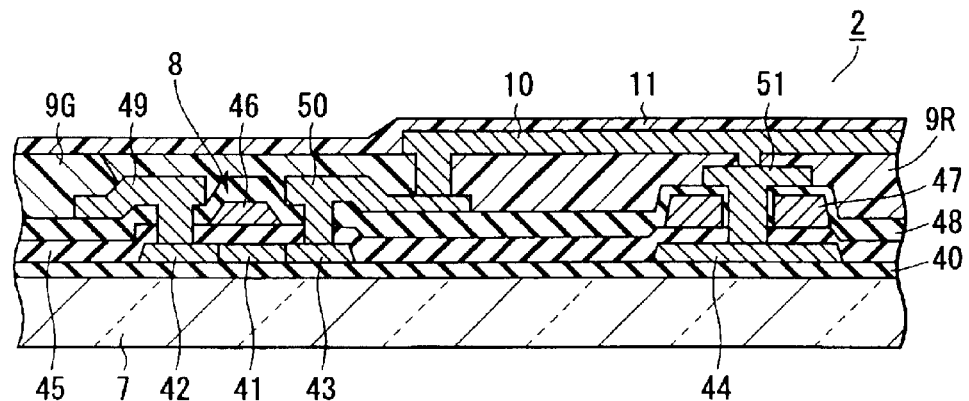
FIG. 10 is a cross sectional view schematically showing the construction of a part of the active matrix substrate included in the liquid crystal display shown in FIG. 1.

FIG. 10 is a cross sectional view schematically showing the construction of a part of the active matrix substrate 2 included in the liquid crystal display 1 shown in FIG. 1. In this Example, the active matrix substrate 2 shown in FIG. 10 was prepared first as follows.

First, an undercoat layer 40 was formed on a glass substrate 7. Then, a polysilicon layer was formed on the undercoat layer 40, followed by patterning the polysilicon layer and subsequently doping the patterned polysilicon layer with an impurity. As a result, formed were a channel region 41 as a semiconductor layer of a TFT 8, a drain region 42 and a source region 43 each doped with an impurity, and an auxiliary capacitor electrode 44. Then, a gate insulator 45 was formed to cover the channel region 41, the drain region 42, the source region 43 and the auxiliary capacitor electrode 44. Incidentally, contact holes were formed in the gate insulator 45 in the positions corresponding to the drain region 42, the source region 43 and the auxiliary capacitor electrode 44.

Next, a scanning line 46, which serves as a gate electrode, too, and an auxiliary capacitor line 47 were formed on the gate insulator 45, followed by forming an interlayer insulating film 48 in a manner to cover the scanning line 46 and the auxiliary capacitor line 47. A contact hole communicating with the contact hole of the gate insulator 45 was formed in the interlayer insulating film 48. Then, a signal line 49, which serves as a drain electrode, too, a source electrode 50, and a contact electrode 51 were formed on the interlayer insulating film 48.

Incidentally, the signal line 49 was arranged to cross each of the scanning line 46 and the auxiliary capacitor line 47 at substantial right angles. The auxiliary capacitor line 47 was insulated from the contact electrode 51. In this case, a molybdenum-tungsten was used for forming each of the scanning line 46 and the auxiliary capacitor line 47. On the other hand, an aluminum-based material was used for forming the signal line 49.

Next, the color filter 9 and the peripheral light shielding layer 12 were formed on the surface of the resultant structure. To be more specific, the surface of the substrate 7 on which the TFT 8, etc. was formed was coated with an ultraviolet-curing acrylic resin resist having a red pigment dispersed therein, by using a spinner. Then, the coated resin resist film was dried at 90° C. for 100 minutes, followed by irradiating the portion of the coated film, in which a red coloring layer 9R is to be formed, with ultraviolet light having a wavelength of 365 nm at an intensity of 100 mJ/cm². The irradiation of the coated film with with ultraviolet light was performed via a prescribed photomask. Then, the coated film was subjected to a developing treatment for 20 seconds by using a 1% aqueous solution of KOH so as to form a red coloring layer 9R having a thickness of 3.2 μm. Further, a green coloring layer 9G and a blue coloring layer 9B were successively formed by a method similar to that above for forming the red coloring layer 9R. A baking treatment was then applied at 200° C. for 60 minutes so as to obtain a color filter 9 including the red, green and blue coloring layers 9R, 9G and 9B.

Incidentally, the wavelength of the visible light exhibiting the highest transmittance, i.e., the maximum transmission wavelength, of the red coloring layer 9R was found to be 620 nm. Also, the maximum transmission wavelength of the green coloring layer 9G was found to be 550 nm, and the maximum transmission wavelength of the blue coloring layer 9B was found to be 440 nm. Also, contact holes for connecting the pixel electrode 10 to the source electrode 50 and to the auxiliary capacitor electrode 51 were formed in the color filter 9. Further, the blue, green and red coloring layers 9B, 9G and 9R constituting the color filter 9 were allowed to partially overlap with each other so as to form spacer 19 shown in FIG. 1.

Next, an ITO layer was formed to a thickness of 150 nm on the color filter 9 by a sputtering method via a mask of a prescribed pattern. Then, a resist pattern was formed on the ITO film, and the exposed portion of the ITO film was etched by using the resist pattern as a mask. In this fashion, the pixel electrodes 10B, 10G and 10R shown in FIG. 4 were formed as the pixel electrode 10. Incidentally, the width $W_2$ of the slit 20 was set at 5 μm, and the width $W_1$ of the portion of the pixel electrode 10 that was sandwiched between the adjacent slits 20, i.e., the comb-teeth portion, was also set at 5 μm.

Then, the entire surface of the glass substrate 7 on which the pixel electrode 10 was formed was coated with a thermosetting resin, followed by baking the coated film so as to form a vertical alignment layer 11 having a thickness of 70 nm. In this fashion, preparation of the active matrix substrate 2 was finished.

Next, an ITO film was formed as a common electrode 16 by a sputtering method on one main surface of another glass substrate 15. Then, a vertical alignment layer 17 was formed on the entire surface of the common electrode 16 by a method similar to that used for preparation of the active matrix substrate 2. In this fashion, preparation of a counter substrate 3 was finished.

Then, the active matrix substrate 2 was bonded to the counter substrate 3. To be more specific, the peripheral portion of the active matrix substrate 2 was aligned with the peripheral portion of the counter substrate 3 such that the alignment layer 11 formed on the active matrix substrate 2 was faced the alignment layer 17 formed on the counter substrate 17. Under this condition, the active matrix substrate 2 was bonded to the counter substrate 3 with a thermosetting epoxy resin adhesive layer 18 interposed therebetween, in a manner to leave an injection port for injecting a liquid crystal material into a free space defined by the active matrix substrate 2, the counter substrate 3 and the thermosetting epoxy resin adhesive 18. Then, the resultant structure was heated so as to form a liquid crystal cell. Incidentally, the cell gap of the liquid crystal cell was maintained constant by using the spacer 19 having a height of 4 μm. Also, in bonding the active matrix substrate 2 to the counter substrate 3, the edge portions of the active matrix substrate 2 and the counter substrate 3 were aligned so as to position the active matrix substrate 2 and the counter substrate 3. In other words, high precision positioning utilizing, for example, an alignment mark, was not performed. Further, a conductive material layer, such as a silver paste layer, was formed on the terminal arranged outside the area of the active matrix substrate 2 surrounded by the adhesive layer 18, so as to connect the terminal to the common electrode 16.

Next, a fluorine-series liquid crystal material having a negative dielectric anisotropy was injected into the liquid crystal cell by a standard method, so as to form a liquid crystal layer 4. Then, the liquid crystal injection port was sealed with an ultraviolet-curing resin, and polarizing films 5 were attached to both surfaces of the liquid crystal cell so as to obtain the liquid crystal display 1 shown in FIG. 1.

Incidentally, the transmission easy axis of one of the polarizing films 5 was perpendicular to the transmission easy axis of the other polarizing film 5. Also, the angle made between the longitudinal direction of the slit 20 formed in the pixel electrode 10G and the transmission easy axis of one of the polarizing films 5 and the angle made between the longitudinal direction of the slit 20 formed in the pixel electrode 10G and the transmission easy axis of the other polarizing film 5 were set at 45° and 135°, respectively. Also, the angle made between the longitudinal direction of the slit 20 formed in the pixel electrode 10B and the transmission easy axis of one of the polarizing films 5 and the angle made between the longitudinal direction of the slit 20 formed in the pixel electrode 10B and the transmission easy axis of the other polarizing film 5 were deviated by 12° from 45° and 135°, respectively. Further, the angle made between the longitudinal direction of the slit 20 formed in the pixel electrode 10R and the transmission easy axis of one of the polarizing films 5 and the angle made between the longitudinal direction of the slit 20 formed in the pixel electrode 10R and the transmission easy axis of the other polarizing film 5 were deviated by 10° from 45° and 135°, respectively.

Figure 11:
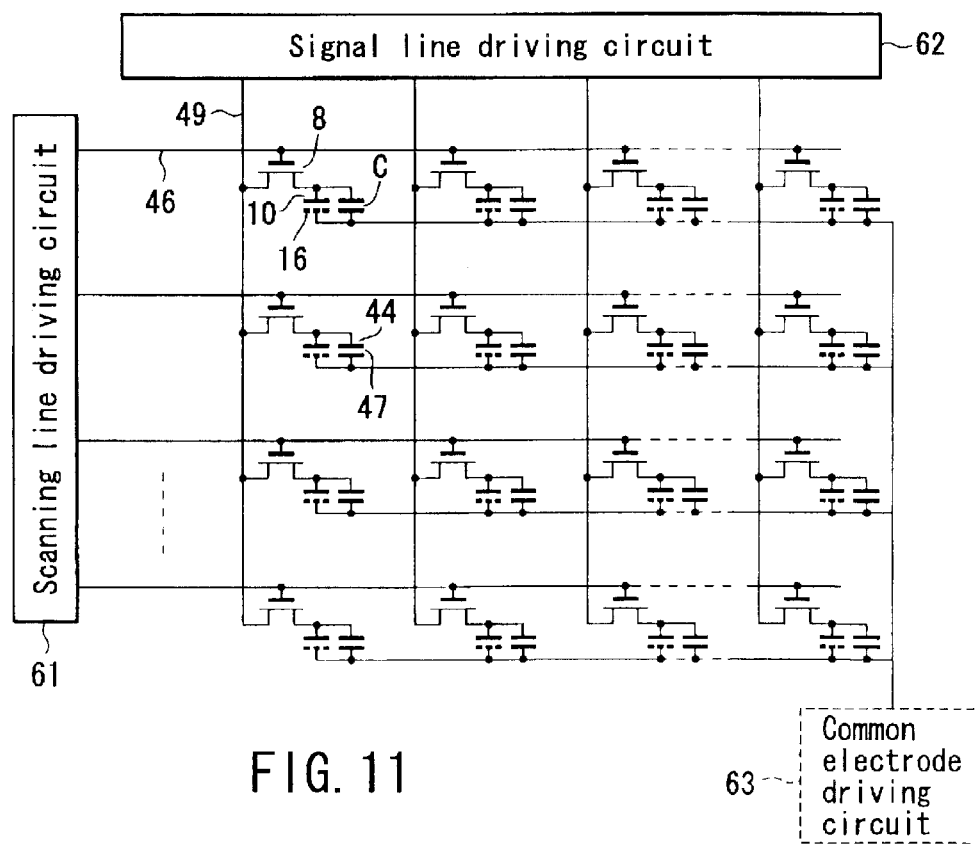
FIG. 11 is an equivalent circuit diagram of the liquid crystal display for Example 1 of the present invention.

FIG. 11 is an equivalent circuit diagram of the liquid crystal display 1. As shown in FIG. 11, (m×n) pixel electrodes 10 are arranged to form a matrix in the liquid crystal display 1. An m-number of scanning lines 46 extend in the row direction of the pixel electrode 10 and are arranged in the column direction. On the other hand, an n-number of signal lines 49 extend in the column direction of the pixel electrode 10 and are arranged in the row direction.

The scanning line 46 is connected to a scanning line driving circuit 61, and the signal line 49 is connected to a signal line driving circuit 62. Also, the TFT 8 is connected between the signal line 49 and the pixel electrode 10, and gate of the TFT 8 is connected to the scanning line 46. Further, the common electrode 16 is connected to a common electrode driving circuit 63.

The auxiliary capacitor electrode 44 and the auxiliary capacitor line 47 collectively form an auxiliary capacitor C. The auxiliary capacitor electrode 44 is connected to the pixel electrode 10, and the auxiliary capacitor line 47 is connected to the common electrode 16.

It was possible to drive the liquid crystal display 1 manufactured by the method described above by changing, for example, the voltage applied between the pixel electrode 10 and the common electrode 16 within a range of between about 1V and about 4V. Also, the liquid crystal display 1 was observed under the state that a voltage of 3.5V was applied between the pixel electrode 10 and the common electrode 16. As a result, observed was a distribution of the transmittance conforming with the shape of the pixel electrode 10. Further, the viewing angle characteristics of the liquid crystal display 1 were examined under the conditions described above, with the result that the dependence of the displayed color on the observing angle was scarcely recognized, even in the case where the liquid crystal display 1 was observed in a direction making an angle of 80° with the line normal to the main surface of the liquid crystal display 1.

EXAMPLE 2

In this Example, the relationship between the width $W_2$ of the slit 20 formed in the pixel electrode 10 and the transmittance was examined first.

Figure 12:
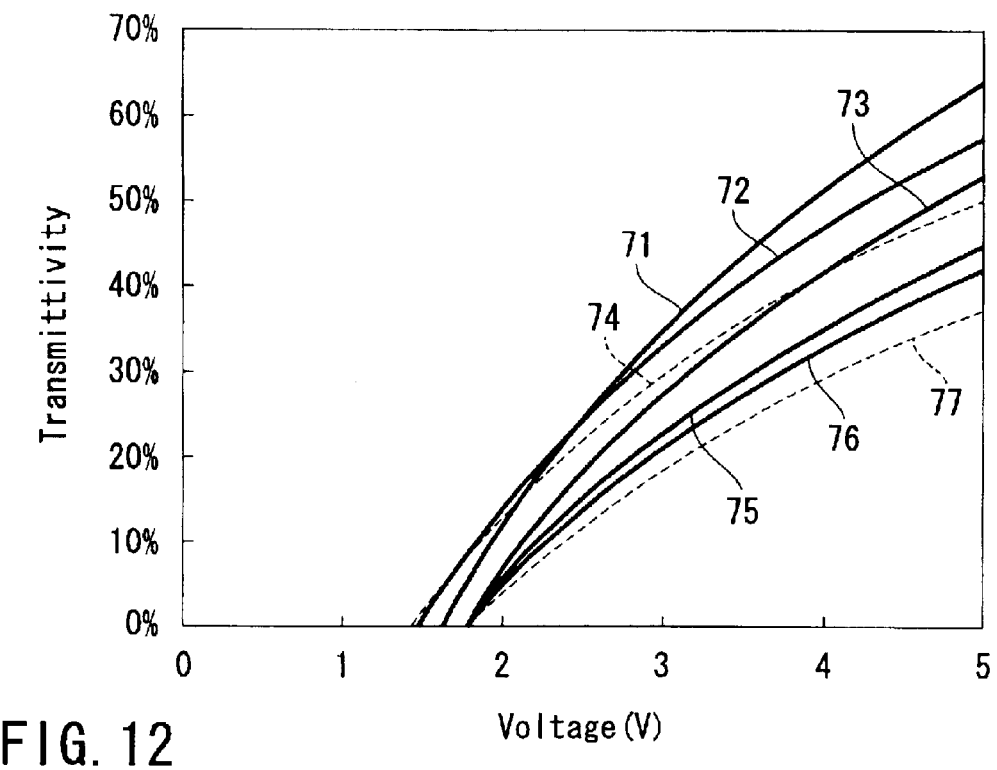
FIG. 12 is a graph exemplifying the relationship between the width of a slit formed in the pixel electrode, and the transmittance.

FIG. 12 is a graph exemplifying the relationship between the width $W_2$ of the slit 20 formed in the pixel electrode 10 and the transmittance. In the graph of FIG. 12, the voltage applied between the pixel electrode 10 and the common electrode 16 is plotted on the abscissa, and the transmittance is plotted on the ordinate.

Incidentally, the data given in FIG. 12 was obtained in the case where the product Δn×d of the refractive index anisotropy Δn relating to the wavelength of 593 nm and the thickness d of the liquid crystal layer 4 was 325 nm. To be more specific, curve 71 shown in FIG. 12 denotes the transmittance in the case where the maximum transmission wavelength is 440 nm and the width $W_2$ of the slit 20 is 4 µm. Curve 72 shown in FIG. 12 denotes the transmittance in the case where the maximum transmission wavelength is 440 nm and the width $W_2$ of the slit 20 is 5 µm. A curve 73 shown in FIG. 12 denotes the transmittance in the case where the maximum transmission wavelength is 550 nm and the width $W_2$ of the slit 20 is 4 µm. A curve 74 shown in FIG. 12 denotes the transmittance in the case where the transmittance in the case where the maximum transmission wavelength is 440 nm and the width $W_2$ of the slit 20 is 6 µm. A curve 75 shown in FIG. 12 denotes the transmittance in the case where the maximum transmission wavelength is 550 nm and the width $W_2$ of the slit 20 is 6 µm and the transmittance in the case where the maximum transmission wavelength is 620 nm and the width $W_2$ of the slit 20 is 4 µm. Curve 76 shown in FIG. 12 denotes the maximum transmission wavelength is the transmittance in the case where the maximum transmission wavelength is 620 nm and the width $W_2$ of the slit 20 is 5 µm. Further, curve 77 shown in FIG. 12 denotes the transmittance in the case where the maximum transmission wavelength is 620 nm and the width $W_2$ of the slit 20 is 6 µm.

As shown in FIG. 12, the transmittance is dependent on the width $W_2$ of the slit 20. In other words, it is possible to change the effective refractive index anisotropy Δn of the liquid crystal material in accordance with the width $W_2$ of the slit 20.

Next, examined were the conditions which permit the transmittance to be 40% in the case of applying a voltage of 4.5V between the pixel electrode 10 and the common electrode 16.

Figure 13:
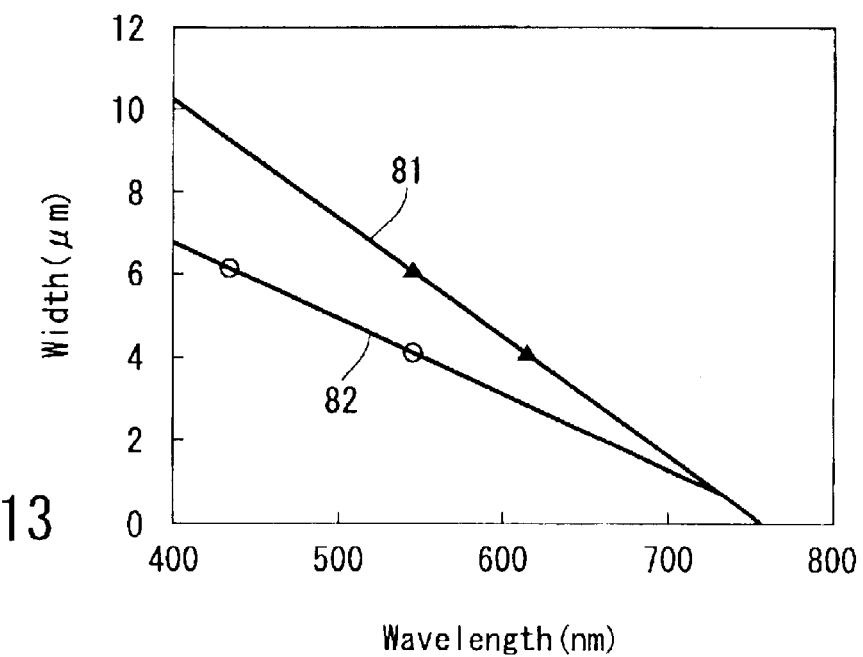
FIG. 13 is a graph showing the influence of the wavelength on the relationship between the width of a slit formed in the pixel electrode, and the transmittance.

FIG. 13 is a graph showing how the wavelength affects the relationship between the width $W_2$ of the slit 20 formed in the pixel electrode 10 and the transmittance. In the graph of FIG. 13, the wavelength is plotted on the abscissa, and the width $W_2$ of the slit 20 is plotted on the ordinate. Incidentally, a line 81 shown in FIG. 13 denote the conditions which permit the transmittance to be 40% in the case of applying a voltage of 4.5V between the pixel electrode 10 and the common electrode 16. On the other hand, line 82 shown in FIG. 13 denotes the conditions which permit the transmittance to be 40% in the case of applying a voltage of 3.8V between the pixel electrode 10 and the common electrode 16.

The data given in FIG. 13 can be utilized in the case where, for example, it is desirable to make the blue, green and red pixel regions equal to each other in the transmittance. To be more specific, uniform transmittance can be achieved by setting the width $W_2$ of the slit 20 formed in each of the pixel electrodes 10B, 10G and 9R at a value obtained by referring the maximum transmission wavelength of each of the blue, green and red coloring layers 9B, 9G and 9R to the data given in FIG. 13. In other words, the adjustment of the color tone, e.g., the white balance, can be achieved by appropriately setting the width $W_2$ of the slit 20 formed in each of the pixel electrodes 10B, 10G and 10R.

Next, prepared was a liquid crystal display 1 by a method similar to the method in Example 1, except that the construction shown in FIG. 5 was employed in the pixel electrode 10. Incidentally, the width $W_{2R}$ of the slit 20 was set at 2.7 µm, the width $W_{2G}$ of the slit 20 was set at 4.0 µm, and the width $W_{2B}$ of the slit 20 was set at 6.0 µm. What should be noted is that the width $W_2$ of the slit 20 was set smaller in the pixel electrode 10 positioned to face the coloring layer having longer maximum transmission wavelength, and the width $W_2$ of the slit 20 was set larger in the pixel electrode 10 positioned to face the coloring layer having shorter maximum transmission wavelength. In other words, the area ratio of the pixel electrode 10 to a unit area was set higher in the pixel electrode 10 positioned to face the coloring layer having longer maximum transmission wavelength, and the area ratio of the pixel electrode 10 to a unit area was set lower in the pixel electrode 10 positioned to face the coloring layer having shorter maximum transmission wavelength. Also, the width $W_1$ of the portion of the pixel electrode 10 sandwiched between the adjacent slits 20, i.e., the comb-teeth portion, was set at 5 μm.

It was possible to drive the liquid crystal display 1 manufactured by the method described above by changing, for example, the voltage applied between the pixel electrode 10 and the common electrode 10 within a range of between about 1V and about 5V. Also, the liquid crystal display 1 was found to be capable of a good white display. The display characteristics of the liquid crystal display 1 are shown in the table given below:

|  | Transmissivity (%) | Uniformity of domain size | Response time (ms) |
| --- | --- | --- | --- |
| Ex.2 | 17 | Good | 25 |
| Ex.3 | 18 | Good | 23 |
| Ex.4 | 19 | Good | 29 |

Also, the liquid crystal display 1 was observed under the state that voltage of about 4.5V was applied between the pixel electrode 10 and the common electrode 16. As a result, observed was a distribution of the transmittance conforming with the shape of the pixel electrode 10. Further, the viewing angle characteristics of the liquid crystal display 1 were examined under the condition given above, with the result that the dependence of the displayed color on the observing angle was scarcely recognized, even in the case where the liquid crystal display 1 was observed in a direction making an angle of 80° with a line normal to the main surface of the liquid crystal display 1.

EXAMPLE 3

In this Example, prepared was a liquid crystal display 1 in which the construction shown in FIG. 5 was employed in the pixel electrode 10 by a method similar to the method described previously in conjunction with Example 2. In Example 3, however, the width $W_1$ of the portion of the pixel electrode 10 sandwiched between the adjacent slits 20, i.e., the comb-teeth portion, was set at 4 μm.

It was possible to drive the liquid crystal display 1 by, for example, changing the voltage applied between the pixel electrode 10 and the common electrode 16 within a range of between about 1V and about 5V. The display characteristics of the liquid crystal display 1 are also shown in the table given above.

Also, the liquid crystal display 1 was observed under the state that voltage of about 4.5V was applied between the pixel electrode 10 and the common electrode 16. As a result, observed was a distribution of the transmittance conforming with the shape of the pixel electrode 10. Further, the viewing angle characteristics of the liquid crystal display 1 were examined under the condition given above, with the result that the dependence of the displayed color on the observing angle was scarcely recognized, even in the case where the liquid crystal display 1 was observed in a direction making an angle of 80° with a line normal to the main surface of the liquid crystal display 1.

EXAMPLE 4

In this Example, prepared was a liquid crystal display 1 in which a construction similar to that shown in FIG. 5 was employed in the pixel electrode 10 by a method similar to the method described previously in conjunction with Example 2. In Example 4, however, the construction shown in FIG. 9A was employed in place of forming the slit 20 in the pixel electrode 10. To be more specific, prepared was the pixel electrode 10 in which the slit 20 was not formed, and a dielectric layer 21 was formed to a thickness of 1.4 μm on the pixel electrode 10 such that the dielectric layer 21 was patterned like the slit 20.

It was possible to drive the liquid crystal display 1 by, for example, changing the voltage applied between the pixel electrode 10 and the common electrode 16 within a range of between about 1V and about 5V. The display characteristics of the liquid crystal display 1 are also shown in the table given above.

Also, the liquid crystal display 1 was observed under the state that voltage of about 4.5V was applied between the pixel electrode 10 and the common electrode 16. As a result, observed was a distribution of the transmittance conforming with the shape of the pixel electrode 10. Further, the viewing angle characteristics of the liquid crystal display 1 were examined under the condition given above, with the result that the dependence of the displayed color on the observing angle was scarcely recognized even in the case where the liquid crystal display 1 was observed in a direction making an angle of 80° with a line normal to the main surface of the liquid crystal display 1.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display, comprising:
an array substrate with first to third pixel electrodes on a main surface thereof;
a counter substrate with a common electrode that faces the first to third pixel electrodes on a main surface thereof;
a liquid crystal layer sandwiched between the array and counter substrates; and
a color filter supported by one of the array and counter substrates and comprising first to third coloring layers facing the first to third pixel electrodes, respectively,
wherein the display is configured to form first and second optical regions different from each other in electric field intensity in each of first to third pixel regions between the common electrode and the first to third pixel electrodes when voltage is applied therebetween, the first and second optical regions extending in a direction that is parallel to the liquid crystal layer and alternately arranged in a direction that crosses a longitudinal direction of the first optical region in each of the first to third pixel regions, and the first pixel region being different in the longitudinal direction of the first optical region from the second and third pixel regions.

2. The display according to claim 1, wherein each of the first to third pixel regions comprises at least two domains each including the first and second optical regions, the longitudinal direction of the first optical region in one of the domains and the longitudinal direction of the first optical region in the other of the domains being parallel or perpendicular to each other, and the domains being different from each other in director of liquid crystal molecules, which is contained in the liquid crystal layer, on application of voltage.

3. The display according to claim 1, wherein each of the first to third pixel electrode is provided with a slit at a position corresponding to the second optical region.

4. The display according to claim 3, wherein each of the first to third pixel electrodes is a comb-shaped electrode.

5. The display according to claim 1, further comprising polarizers on outer surfaces of the array and counter substrates, wherein the longitudinal direction of the first optical region in one of the first to third pixel regions crosses a transmission easy axis of one of the polarizers at an angle of 45°.

6. The display according to claim 5, wherein the color filter comprises blue, green and red coloring layers as the first to third coloring layers, and one of the first to third pixel regions, in which the longitudinal direction of the first optical region crosses the transmission easy axis of one of the polarizers at an angle of 45°, faces the green coloring layer.

7. The display according to claim 1, further comprising vertical alignment layers on the first to third pixel electrodes and on the common electrode, respectively, wherein the liquid crystal layer contains a liquid crystal material with negative dielectric anisotropy.

8. The display according to claim 1, wherein the common electrode is a flat continuous layer.

9. The display according to claim 1, wherein the color filter is supported by the array substrate.

* * * * *